United States Patent
Eckstein

(10) Patent No.: US 12,258,151 B2
(45) Date of Patent: Mar. 25, 2025

(54) SATELLITE DISPENSING SYSTEM

(71) Applicant: Blue Origin, LLC, Kent, WA (US)

(72) Inventor: Eric Eckstein, Renton, WA (US)

(73) Assignee: Blue Origin, LLC, Kent, WA (US)

( * ) Notice: Subject to any disclaimer, the term of this patent is extended or adjusted under 35 U.S.C. 154(b) by 172 days.

(21) Appl. No.: 18/296,459

(22) Filed: Apr. 6, 2023

(65) Prior Publication Data

US 2023/0242282 A1 Aug. 3, 2023

Related U.S. Application Data

(63) Continuation of application No. 17/401,152, filed on Aug. 12, 2021, now Pat. No. 11,649,074.

(51) Int. Cl.
*B64G 1/64* (2006.01)

(52) U.S. Cl.
CPC .............. *B64G 1/641* (2013.01); *B64G 1/643* (2023.08)

(58) Field of Classification Search
CPC ...... B64G 1/641; B64G 1/643; B64G 1/1085; B64G 1/645; B64G 1/66; B64G 1/22
See application file for complete search history.

(56) References Cited

U.S. PATENT DOCUMENTS

| | | | |
|---|---|---|---|
| 11,396,389 B2 | 7/2022 | Eaton et al. | |
| 2011/0240802 A1 | 10/2011 | Balinov | |
| 2015/0353211 A1* | 12/2015 | London | B64G 1/641 |
| | | | 244/173.3 |
| 2018/0111707 A1 | 4/2018 | Poncet et al. | |
| 2018/0194494 A1 | 7/2018 | Dube | |
| 2021/0221540 A1 | 7/2021 | Panetti et al. | |
| 2022/0194635 A1* | 6/2022 | Aston | B64G 1/002 |

* cited by examiner

*Primary Examiner* — Medhat Badawi
*Assistant Examiner* — Vicente Rodriguez
(74) *Attorney, Agent, or Firm* — Summit Patents PC

(57) ABSTRACT

Stacked satellite dispensing systems are described herein. The disclosed systems have diagonal struts that stabilize satellite stacks horizontally and vertically without adding performance-reducing mass. The diagonal struts increase the number of bracing points and improve stability. The improved stability can allow for the satellite stack to be made heavier and taller, such as by having more satellites than a dispensing system with vertical struts. The diagonal struts, which provide the improved stability, can also allow for sub-stacks to be used. The sub-stacks include batches of satellites retained by the stacked satellite dispensing system. Therefore, the stacked satellite dispending system can release single satellites batches at once, rather than all the satellites at once.

20 Claims, 5 Drawing Sheets

SATELLITE DISPENSING SYSTEM

CROSS REFERENCE TO RELATED APPLICATIONS

This application is a Continuation of co-pending U.S. application Ser. No. 17/401,152, entitled, SATELLITE DISPENSING SYSTEM," filed Aug. 12, 2021, which is incorporated herein by reference in its entirety for all purposes.

BACKGROUND

Satellite dispensing systems, such as those stored in and launched by rockets, typically comprise a central mounting structure, to which multiple satellites are individually attached. In this embodiment, the satellites are typically deployed individually or in pairs. Another embodiment includes a vertical stack of satellites, which are collectively clamped to a base structure under the stack. In this embodiment, the satellites are typically deployed en masse. The stacks of satellites can be dispersed via momentum, a propulsion system, or the like, depending on the launch vehicle, dispensing system, or launch plan.

Conventional satellite dispensing systems of individually attaching satellites to a central mounting structure tend to be bulky and do not efficiently use physical space within a payload fairing. In addition, because individual separation devices are required for each satellite, a great number of costly separation devices are required in total.

Conventional stacked satellite dispensing systems provide a minimal amount of lateral stability to resist forces exerted on the satellite stack in a direction that is perpendicular to a height of the satellite stack. Therefore, the number of satellites within the satellite stack is limited by the inability or limited ability of the satellite stack to resist the lateral inertial forces exerted on the satellite stack. Accordingly, heavier and taller satellite stacks (i.e., satellite stacks with more satellites) cannot be used with current stabilizing systems.

Furthermore, conventional stacked-satellite satellite dispensing systems need to release the entire satellite stack at once. This causes the satellites of the satellite stack to be dispensed in single location. Therefore, multiples launches are required to dispense satellites at two separate locations. This can lead to greater cost and lower dispensing efficiency.

The art would benefit from a stacked satellite dispensing system that more efficiently withstands forces exerted on the stacked satellite dispensing system, thus allowing the dispenser to carry more satellites. The art would also benefit from a stacked satellite dispensing system that allow satellites to be deployed in batches, rather than all at once.

DETAILED DESCRIPTION

Figure 1:
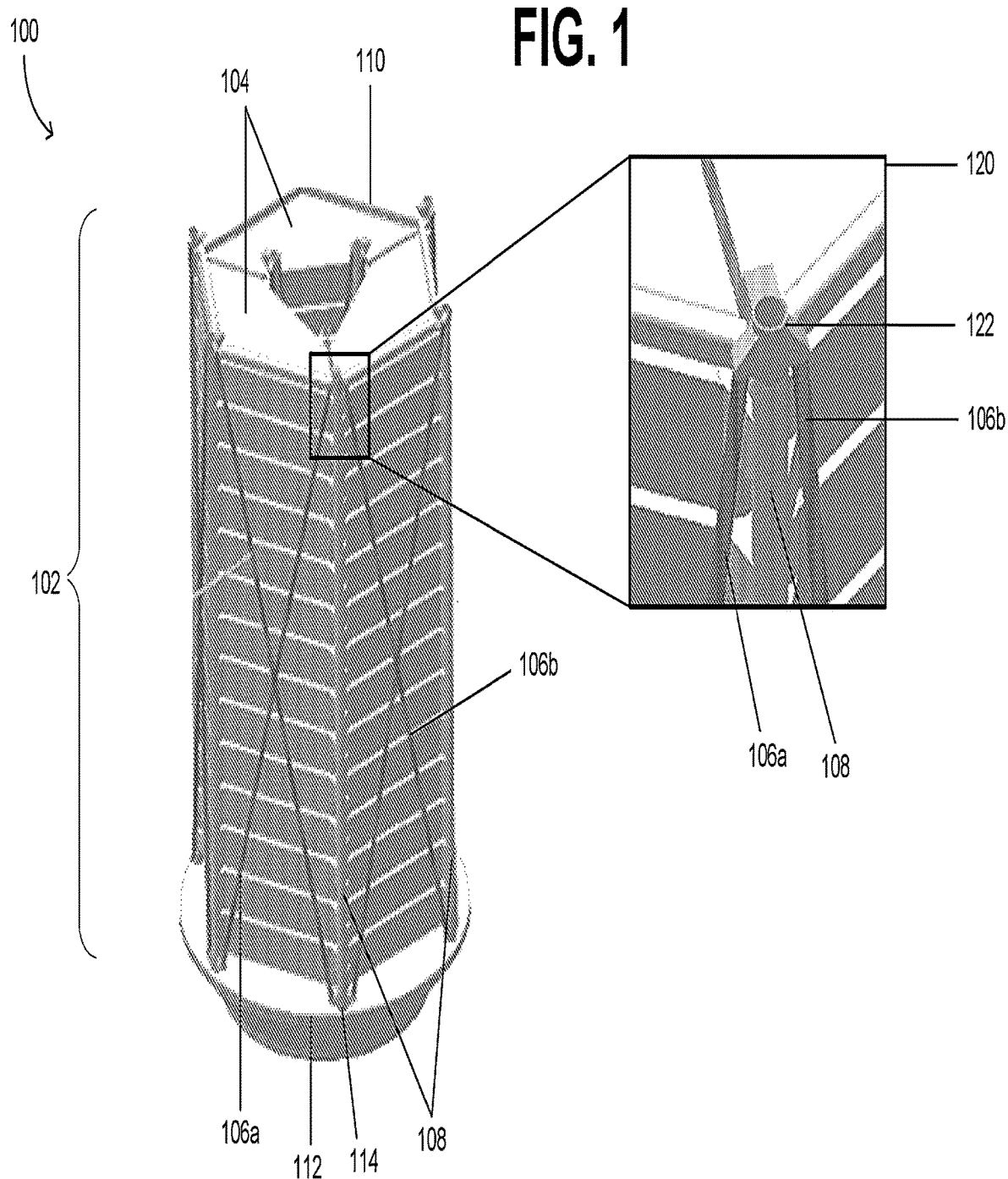
FIG. 1 illustrates an example stacked satellite dispensing system.

Stacked satellite dispensing systems and methods are described herein. Aerospace and rocket designers focus on improving the stability of a satellite stack while also minimizing overall structural mass of the rocket. One particular focus for them is to stabilize the satellites of the satellite stack. Designers then need to enhance the stability of the satellite stack itself because the satellite stack can be exposed to a variety of forces during launch, such as high-altitude winds as the launch vehicle passes through earth's atmosphere into orbit Stacked satellite dispensing systems typically include vertical struts to secure a satellite stack to a base. The vertical struts are jettisoned and the satellites, no longer being secured to the base, are released from the base and disperse into space. The satellites disperse due to momentum of the stacked satellite dispensing system being retained by the satellites once free from the base. Conventional stacked satellite dispensing systems provide a minimal amount of lateral stability to resist forces exerted on the satellite stack in a direction that is perpendicular to a height of the satellite stack. Therefore, the number of satellites within the satellite stack is limited by the inability or limited ability of the satellite stack to resist the forces exerted on the satellite stack. Accordingly, heavier and taller satellite stacks (i.e., satellite stacks with more satellites) cannot be used with current stabilizing systems.

Another focus of aerospace and rocket designers is on increasing the number of satellites in the satellite stack, subject to the stability of the satellite stack based on the proposed number of satellites. Therefore, improving the stability of the satellite stack can allow for the addition of more satellites to the satellite stack. The disclosed systems have diagonal struts (i.e., struts extending at an oblique angle) that stabilize satellite stacks horizontally and vertically without adding performance-reducing mass. Rather than stabilizing one or two axes (e.g., one or two of the x-axis, y-axis, and z-axis), the diagonal struts increase stability along all 3 axes (e.g., x-axis, y-axis, and z-axis). The increased stability allows for heavier and taller satellite stacks (i.e., satellite stacks with more total satellites) to be used.

Aerospace and rocket designer can also focus on dispensing groups of satellites at different locations in space. This can be done to more evenly dispense satellites or to dispense satellites at distinct locations to reduce the number of required launches, increase dispensing efficiency, reduce cost, or the like. For example, a first group of satellites can be dispensed when the system reaches a first location. Then, a send group of satellites can be dispensed when the system reaches a second location.

The improved stability can allow for the satellite stack to be made heavier and taller, such as by having more satellites than a dispensing system with vertical struts. The diagonal struts, which provide the improved stability, can also allow for sub-stacks to be used. The sub-stacks include batches of satellites retained by the stacked satellite dispensing system. Therefore, the stacked satellite dispending system can release single satellites batches at once, rather than all the satellites at once.

The diagonal struts can also reduce the number of pyrotechnics incorporated into the satellite stack or dispensing system. Pyrotechnics can be costly, unreliable (i.e., fail to fire), or both. Removing or reducing the number of pyrotechnics can reduce the cost of the satellite stack of dispensing system, improve the reliability of the satellite stack or dispensing, or both.

FIG. 1 shows a stacked satellite dispensing system 100. The stacked satellite dispensing system 100 includes a base 112 and a satellite stack 102. The base 112 is a platform on which the satellite stack 102 is located or supported. The satellite stack 102 includes columns of satellites 104, such that each column includes satellites 104 stacked on top of each other. The satellite stack 102 can include any appropriate number of columns (e.g., 1, 2, 3, 4, or more) based on the configuration of the satellites 104, the total load (i.e., mass or volume) of the satellite stack 102, the number of satellites 104 to be deployed, the like, or combinations thereof.

The stacked satellite dispensing system 100 also includes a first diagonal strut 106a and a second diagonal strut 106b. The first and second diagonal struts 106a, 106b can extend from the top satellite towards the bottom satellite of the satellite stack 102 or can be adjoined at the top of a cup pillar 108 by a strut coupling 122, as shown in magnified view 120. The first and second diagonal struts 106a, 106b can be adjoined to the strut coupling 122, such as by an adhesive, by welding, by molding as a single piece, or the like. The strut coupling 122 can include arms, holes, or bores to accept each of the first and second diagonal struts 106a, 106b. The strut coupling 122 can also include a stacking cup to mate the first and second diagonal struts 106a, 106b to a stacking cup of the top satellite. The stacking cup of the strut coupling 122 can be male, female, or male and female.

The first and second diagonal struts 106a, 106b extend from the strut coupling 122 in different directions towards the base 112, such as towards a strut bracket 114 at the bottom of an adjacent cup pillar. For example, first and second diagonal struts are connected via a strut coupling at the top of a first cup pillar. The first diagonal strut extends diagonally from the top of the first cup pillar to a strut bracket the bottom of a second cup pillar. The second cup pillar is to the left of the first cup pillar. The second diagonal strut extends diagonally from the top of the first cup pillar to a strut bracket at the bottom of a third cup pillar. The third cup pillar is to the right of the first cup pillar.

The satellite stack 102 also includes cup pillars 108. The satellite stack 102 can include two or more cup pillars based on the number of sides or edges, based on the mass to be supported, or the like. Each cup pillar 108 is formed from stacking cups of all the satellites 104 of the satellite stack 102. The stacking cups of each cup pillar 108 are coaxial (i.e., having a common axis, such as an axis extending through the stacking cups of the cup pillar 108) along a given column or along two columns. The cup pillars 108 can be on an external surface of the satellite stack 102. For example, a first cup pillar is formed from a first group of coaxial stacking cups of the satellites of the satellite stack 102. A second cup pillar is formed from a second group of coaxial stacking cups of the satellites of the satellite stack 102.

The satellite stack 102 can also include internal cup pillars that form an internal cavity extending through the satellite stack 102.

The satellite stack 102 also includes stack sidewalls formed by external sidewalls of the satellites 104. The satellite stack 102 can include two or more stack sidewalls based on satellite design, stack configuration or the like. The external sidewalls forming the stack sidewalls can be coplanar (i.e., the external sidewalls lie on the same plane). The stack sidewalls are formed from sidewalls of multiple satellites which extend between adjacent cup pillars 108. The stack sidewalls can be traversed by the two diagonal struts, each of the two diagonal struts being from a pair of diagonal struts sharing the same strut coupling 122. For example, the two diagonal struts traversing the same stack sidewall form an "X," where the two diagonal struts sharing the same strut coupling form a caret or a hat (e.g., "^").

The satellite dispensing system 100 can also include support rods 110, which extend between adjacent strut couplings 122. The support rods 110 can support the satellite stack 102 vertically (i.e., increase force or pressure exerted downwardly on the satellites 104 to inhibit or reduce movement), horizontally (i.e., provide a surface against which the cup pillars 108 can press at a distance furthest from the base 114 to eliminate or reduce any torque due to externally applied forces), or both vertically and horizontally.

Figure 2:
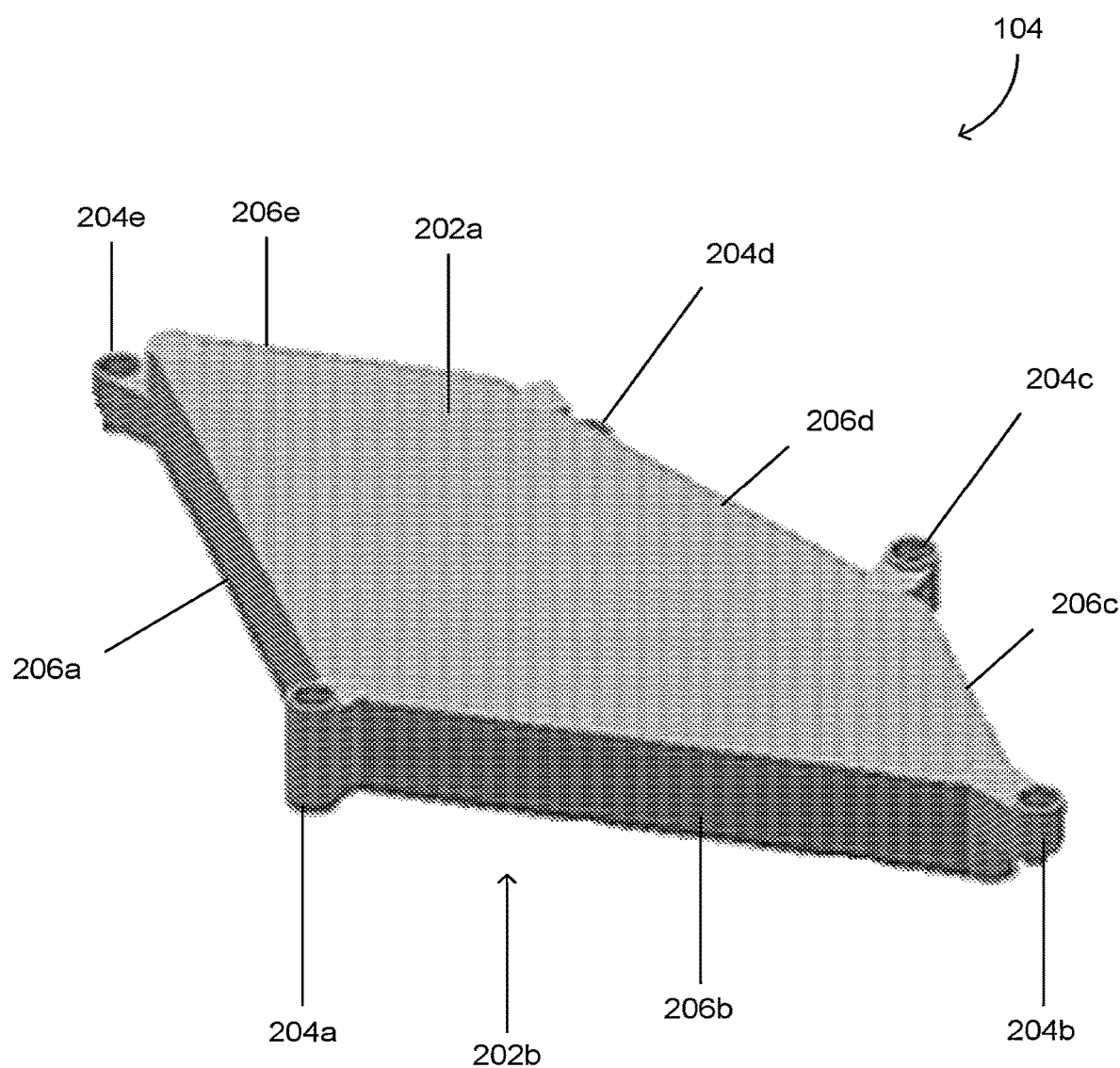
FIG. 2 illustrates an example satellite of the example stacked satellite dispensing system.

FIG. 2 shows an example satellite 104. The satellite 104 is an individual satellite of the satellite stack 102. Once dispersed or deployed from the satellite stack 102, the satellite 104 can be part of a satellite constellation (i.e., multiple satellites which form a network), such that each satellite of the satellite constellation can communication with other satellites of the satellite constellation, a ground transceiver, or other satellites and the ground transceiver. The satellite constellation can be used as a communication system, for space observation, Internet or telecommunications service, or the like, with each satellite acting as a node within the network.

The satellite 104 includes a main body and stacking cups 204a-204e. The main body includes a housing and components, devices, or systems. The housing can provide a surface to support the components, devices, or systems, or to which the components, devices, or systems can be attached. The housing can also encase or partially encase the components, devices, or systems to protect the components, devices, or systems from external forces or elements. The housing includes a first side 202a and a second side 202b adjoined by sidewalls, such as sidewalls 206a-206e. The first side 202a, when in a satellite stack, faces a satellite above or below satellite 104. The second side 202b, when in a satellite stack, faces a satellite above or below satellite 104. When the satellite 104 is a top satellite in the satellite stack, one of the first or second sides 202a, 202b can face open space or another satellite (e.g., a satellite beneath the satellite 104 in the satellite stack or another satellite from another satellite stack). When the satellite 104 is a bottom satellite in the satellite stack, one of the first or second sides 202a, 202b can face a base or another satellite (e.g., a satellite on top of the satellite 104 in the satellite stack or another satellite from another satellite stack).

The sidewalls, such as sidewalls 206a-206e, can form an external surface of the satellite stack. The sidewalls can also form an internal cavity of the satellite stack, such as when in a circle or circular shape.

The components, devices, or systems can include antennas, processors, memory, propulsion system, navigation sensors, proximity detectors, the like, or combinations or multiples thereof.

The stacking cups 204a-204e provide an interface by which adjacent satellites in a satellite stack can be stacked on each other. The stacking cups 204a-204e can also provide an interface by which the top satellites in each stack or sub-stack can engage with a strut coupling. The stacking cups 204a-204e can also provide an interface by which the bottom satellites in each stack or sub-stack can engage with a strut bracket or a base.

The stacking cups 204a-204e of the satellite 104 can be male, female, or male and female, such that the adjacent satellites include stacking cups having complementary male or female connections.

The stacking cups 204a-204e can be located on the sidewalls (e.g., sidewalls 206a-206e) of the satellite 104, on corners of the satellite formed by adjoining sidewalls (e.g., sidewalls 206a-206e), or on both sidewalls and corners of the satellite 104.

Though two sidewalls 206a-206e are discussed herein, the satellite 104 can include 2 or more sidewalls, including 2, 3, 4, 5, 6, or more. The number of sidewalls can be determined based on a design, configuration, or shape of the satellite 104 or the satellite stack. Additionally, though two stacking cups 204a-204e are discussed herein, the satellite 104 can include 1 or more stacking cups, including, 1, 2, 3, 4, 5, 6, or more. The number of stacking cups 204a-204e can be determined based on the design, configuration, or shape of the satellite 104 or the satellite stack.

Figure 3A:
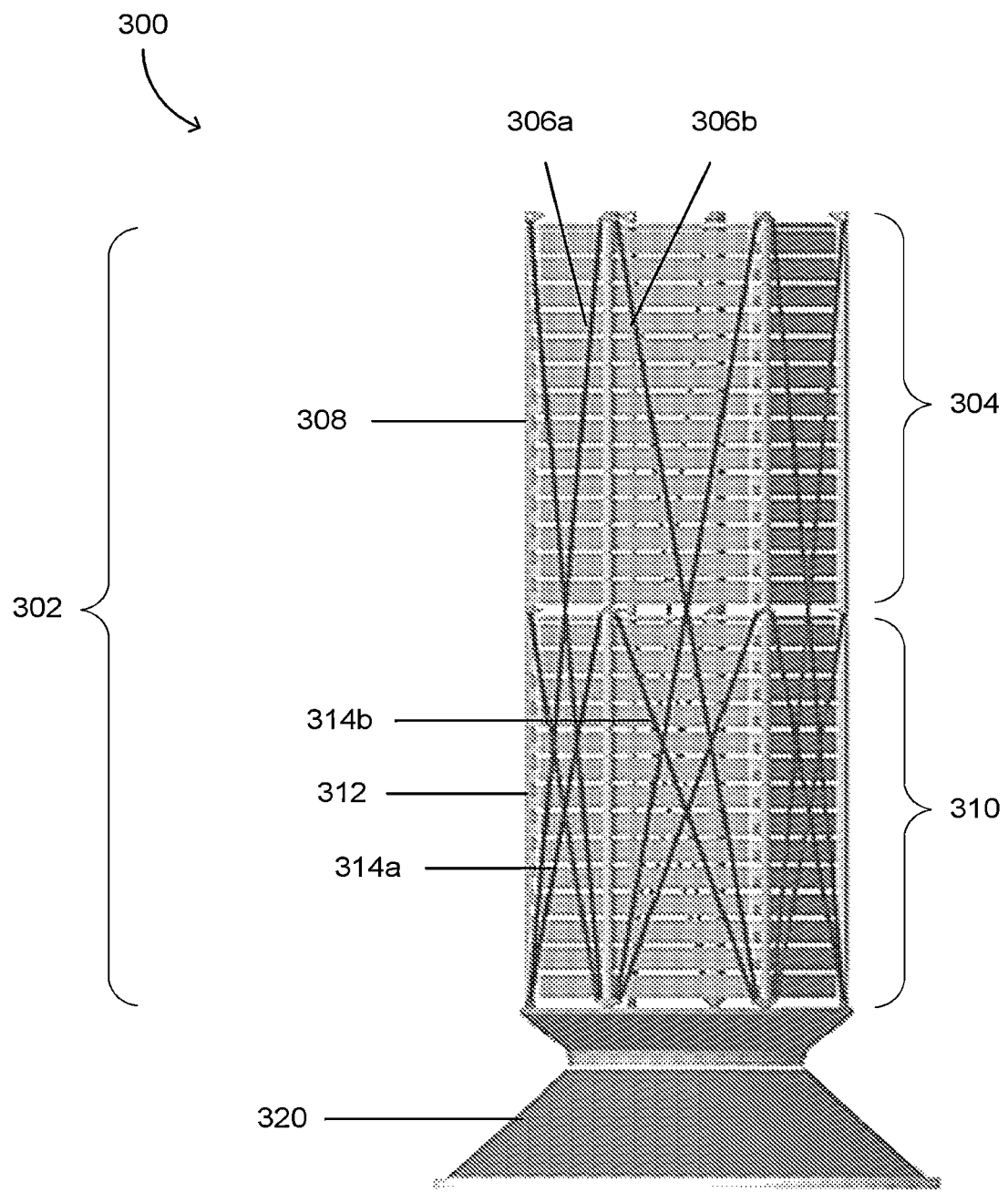
FIGS. 3A-3B illustrate an example stacked satellite dispensing system.
Figure 3B:
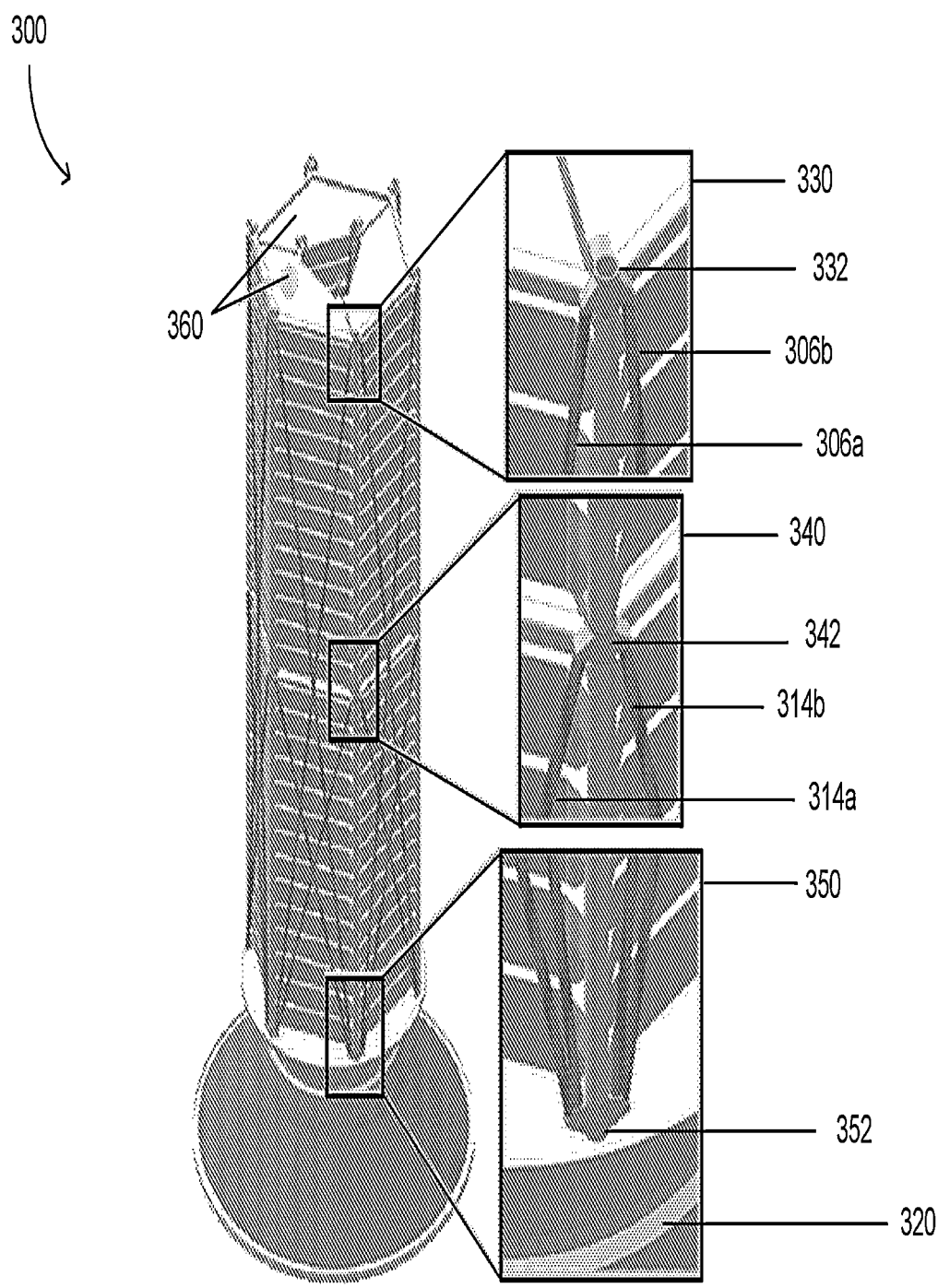

FIGS. 3A-3B show a stacked satellite dispensing system 300. The stacked satellite dispensing system 300 includes a total satellite stack 302 formed by a first satellite sub-stack 304 and a second satellite sub-stack 310. The first and second satellite sub-stacks 304, 310 include columns of satellites 360, such that each column includes satellites 360 stacked on top of each other. The first and second satellite sub-stacks 304, 310 can include any appropriate number of columns (e.g., 1, 2, 3, 4, or more) based on the configuration of the satellites 360, the total load (i.e., mass or volume) of the first and second satellite sub-stacks 304, 310, the number of satellites 360 to be deployed, the like, or combinations thereof. The satellites 360 are similar to the satellite 104.

The first and second satellite sub-stacks 304, 310 are similar to the satellite stack 202, except that the first and second satellite sub-stacks 304, 310 include cup pillars 308, 312, respectively. Furthermore, the first satellite sub-stack 304 is stacked on top of the second satellite sub-stack 310. The stacked satellite dispensing system 300 also includes a base 320, which is a platform on which the second satellite sub-stack 310 is located or supported.

The stacked satellite dispensing system 300 includes sub-stack diagonal struts 314a, 314b. The sub-stack diagonal struts 314a, 314b are similar to the first and second diagonal struts 206a, 206b. The sub-stack diagonal struts 314a, 314b can extend from the top satellite of the second satellite sub-stack 310 to the bottom satellite of the second satellite sub-stack 310 or can be adjoined at the top of a cup pillar 312 via a sub-stack strut coupling 342, as shown in magnified view 340. The sub-stack diagonal struts 314a, 314b can be adjoined to the sub-stack strut coupling 342, such as by an adhesive, by welding, by molding as a single piece, or the like. The sub-stack strut coupling 342 can include arms, holes, or bores to accept each of the sub-stack diagonal struts 314a, 314b.

The sub-stack diagonal struts 314a, 314b stabilize the second satellite sub-stack 310 relative to the base 320 via strut brackets 352. The strut brackets 352 can be attached to or embedded within the base 320. The strut bracket 352 can be adjoined to the respective diagonal struts (e.g., by an adhesive, by welding, by molding as a single piece, or the like) or the diagonal struts can be inserted into the strut bracket 352 (e.g., such as within arms, holes, or bores). The sub-stack diagonal struts 314a, 314b traverse an external sidewall of the second sub-stack 310. The cup pillar 312 of the second satellite sub-stack 310 is similar to the cup pillar 208.

The stacked satellite dispensing system 300 also includes full stack diagonal struts 306a, 306b. The full stack diagonal struts 306a, 306b stabilize the first and second satellite sub-stacks 304, 310 relative to the base 320 via the strut brackets 352, as shown in magnified view 350. The full stack diagonal struts 306a, 306b are similar to the first and second diagonal struts 206a, 206b, except that the full stack diagonal struts 306a, 306b traverse external sidewalls of the first and second sub-stacks 304, 310 (i.e., the full stack 302). The full stack diagonal struts 306a, 306b can extend from the top satellite of the first satellite sub-stack 304 to the bottom satellite of the second satellite sub-stack 310 or can be adjoined at the top of a cup pillar 308 via a full stack strut coupling 332, as shown in magnified view 330. The full stack diagonal struts 306a, 306b can be adjoined to the full stack strut coupling 332, such as by an adhesive, by welding, by molding as a single piece, or the like. The full stack strut coupling 332 can include arms, holes, or bores to accept each of the full stack diagonal struts 306a, 306b. The cup pillar 308 includes the cup pillar 312 of the second satellite sub-stack 310, a cup pillar of the first satellite sub-stack 304, and the strut coupling 342 of the second satellite sub-stack 310.

Figure 4:
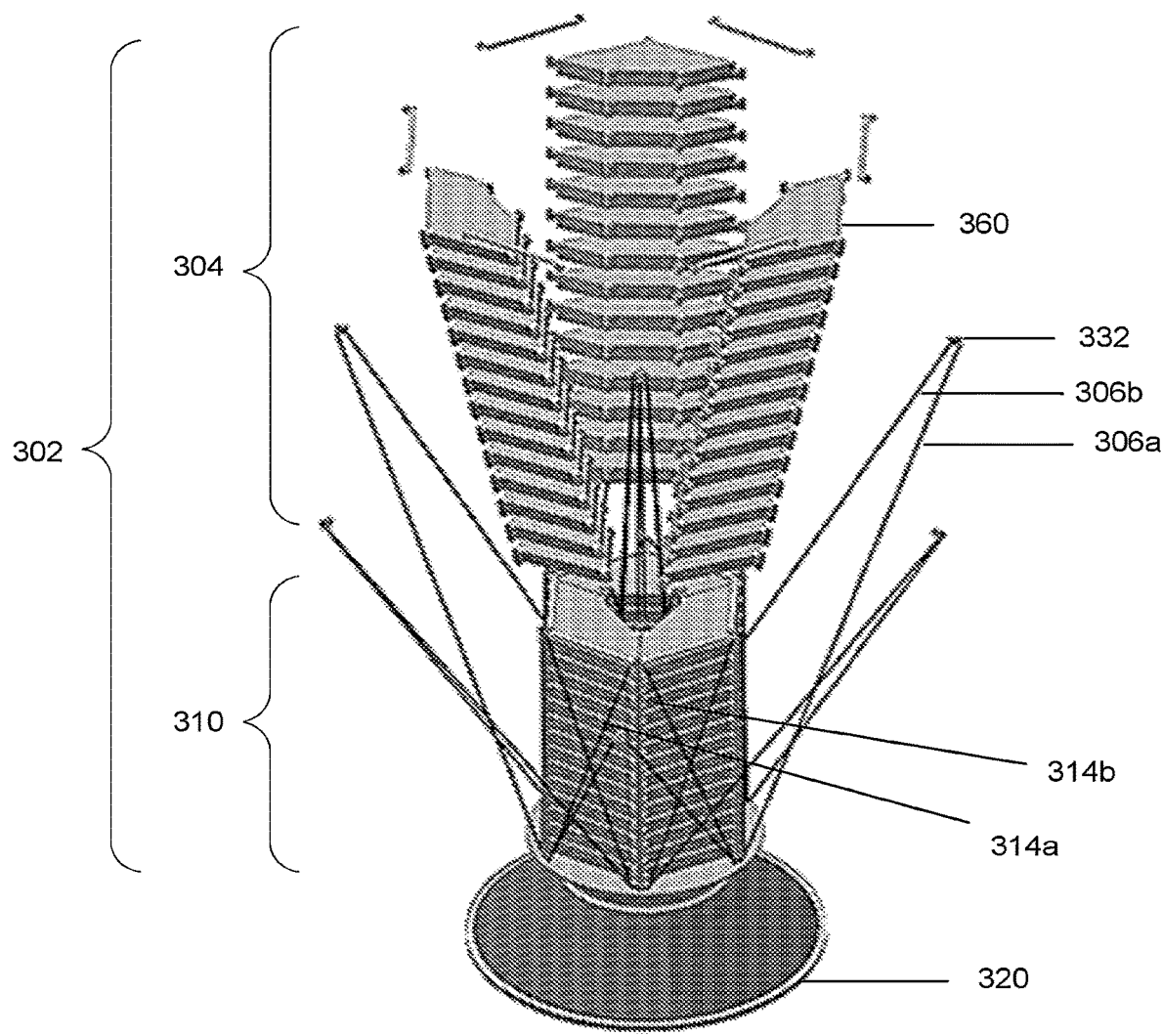
FIG. 4 illustrates example satellites being dispersed from the example stacked satellite dispensing system of FIGS. 3A-3B.

FIG. 4 shows the satellites 360 being dispersed from the stacked satellite dispensing system 300. As discussed below, the full stack diagonal struts 306a, 306b and the sub-stack diagonal struts 316a, 316b can be moved from locked positions to unlocked positions to allow the satellites 360 of the first sub-stack 304 and the satellites 360 of the second sub-stack 310, respectively, to be dispersed from the stacked satellite dispensing system 300. In one example, motors or spring-loaded hinges can used to rotate the strut brackets 352 around an axis on the base 320, thereby pulling the full stack diagonal struts 306a, 306b and the sub-stack diagonal struts 316a, 316b away from the external sidewalls of the first and second sub-stacks 304, 310. In another example, pyrotechnics can be used to jettison the full stack diagonal struts 306a, 306b and the sub-stack diagonal struts 316a, 316b from the stacked satellite dispensing system 300. In yet another example, the full stack diagonal struts 306a, 306b and the sub-stack diagonal struts 316a, 316b can be made longer to remove tension from the struts (e.g., telescopically), such as by a motor, by remove or releasing a clamp, latch, or the like. Once the struts are made longer and the tension has been removed, the struts can rotate away from the external sidewall of the first and second sub-stacks 304, 310 via the strut brackets or can be jettisoned by separating from the strut brackets.

In one example, once the stacked satellite dispensing system 300 reaches a desired trajectory and location in space (e.g., low Earth orbit, which is less an altitude than 2,000 kilometers from the Earth surface), the full stack diagonal struts 306a, 306b are moved from a locked position to an unlocked position. In another example, once a pre-determined time has been reached or after a certain time has passed since launch, the full stack diagonal struts 306a, 306b are moved from a locked position to an unlocked position (i.e., based on a pre-programmed schedule). In yet another example, the full stack diagonal struts 306a, 306b are moved from a locked position to an unlocked position are released manually, such as by a command from an Earth-based controller or a space station controller, whether the controllers are operated by a human or instructed to transmit the command by a processor. The stacked satellite dispensing system 300 can include a communication module (not shown) to communicate with a communication station on Earth or on the space station via Track and Data Relay Satellites (TDRS) or the like.

The locked position, as shown in FIGS. 3A-3B, stabilizes and retains the satellites of the full stack 302 within the stacked satellite dispensing system 300. The locked position is a position in which the full stack strut coupling 332 is mated with a cup of the top satellite of the full stack 302. The unlocked position is a position in which the full stack strut coupling 332 is no longer mated with the cup of the top satellite of the full stack 302. The unlocked position is a position in which the full stack strut coupling 332 is no longer mated with the cup of the top satellite of the full stack 302. The unlocked position, which no longer stabilizes or restrains the satellites 360, allows the satellites 360 of the first sub-stack 304 to be dispersed. The satellites 360 can be dispersed by momentum (i.e., the satellites 360 freely float way from the base 320), by a deployment device (e.g., a mechanical or pneumatic spring, or the like), by a satellite-based propulsion system, or the like. The satellites 360 of the second-sub stack 310 are still retained in the stacked satellite dispensing system 300 because the sub-stack diagonal struts 316a, 316b are still in a locked position.

Once the satellites 360 of the first sub-stack 302 are dispersed, the stacked satellite dispensing system 300 reaches another desired trajectory or location in space (e.g., low Earth orbit, which is orbit at less than an altitude than 2,000 kilometers from the Earth surface), or both, the sub-stack diagonal struts 316a, 316b are moved from a locked position to an unlocked position. The locked position, as shown in FIGS. 3A-3B, stabilizes and retains the satellites of the second sub-stack 310 within the stacked satellite dispensing system 300. The locked position is a position in which the strut coupling 342 is mated with a cup of the top satellite of the second sub-stack 310. The unlocked position is a position in which the strut coupling 342 is no longer mated with the cup of the top satellite of the second sub-stack 310. The unlocked position is a position in which the strut coupling 342 is no longer mated with the cup of the top satellite of the second sub-stack 310. The unlocked position, which no longer stabilizes or restrains the satellites 360, allows the satellites 360 of the second sub-stack 310 to be dispersed. The satellites 360 can be dispersed by momentum (i.e., the satellites 360 freely float way from the base 320), by a deployment device (e.g., a mechanical or pneumatic spring, or the like), by a satellite-based propulsion system, or the like.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A satellite dispensing controller, comprising:
    a processor programmed to:
        determine a first time to release a diagonal strut that secures a first satellite stack of multiple satellite stacks to a rocket;
        generate an instruction to release the diagonal strut securing the first satellite stack to the rocket at the first time;
        generate an instruction to release a securing element that secures a second satellite stack of the multiple satellite stacks to the rocket;
        generate satellite dispensing data that includes the instruction to release the diagonal strut securing the first satellite stack and the instruction to release the securing element securing the second satellite stack;
    an output configured to transmit the satellite dispensing data to a communication module on the rocket.

2. The controller of claim 1, wherein the processor is further programmed to determine the first time to release the first satellite stack based on a time when the first satellite stack is determined to reach a given location or a predetermined time after the rocket is launched.

3. The controller of claim 1, wherein the processor is further programmed to determine the first time to release the first satellite stack based on the time when the first satellite stack is determined to reach a desired trajectory and location in space.

4. The controller of claim 1, wherein the processor is further programmed to determine a second time to release the second satellite stack, and to generate the instruction to release the securing element securing the second satellite stack to the rocket at the second time.

5. The controller of claim 4, wherein the processor is further programmed to determine the second time to release the second satellite stack based on the first time to release the first satellite stack.

6. The controller of claim 1, wherein the first satellite stack is stacked on top of the second satellite stack, and wherein the processor is further programmed to determine a full stack release time to release a full stack strut that extends from a top of the first satellite stack to a bottom of the second satellite stack, the full stack release time timed to occur before the first time at which the diagonal strut securing the first satellite stack to the rocket is released.

7. The controller of claim 6, further comprising an interface between the stacked first satellite stack and the second satellite stack that includes one or more stacking cups.

8. The controller of claim 7, further comprising a full stack coupling and a top satellite cup of the top satellite of the first satellite stack, the full stack coupling structured to mate with the top satellite cup, and wherein when the full stack strut is in a locked position, the full stack coupling is mated to the top satellite cup, and when the full stack strut is in an unlocked position, the full stack coupling is not mated with the top satellite cup and facilitates release of the full stack strut.

9. The controller of claim 6, wherein the full stack strut extends diagonally from the top of the first satellite stack to the bottom of the second satellite stack.

10. The controller of claim 9, wherein the securing element securing the second satellite stack to the rocket is a diagonal strut.

11. The controller of claim 1, wherein the securing element securing the second satellite stack to the rocket is a diagonal strut.

12. The controller of claim 11, wherein the securing element securing the second satellite stack to the rocket extends in a diagonal direction opposite a diagonal direction of the first diagonal strut securing the first satellite stack to the rocket.

13. The controller of claim 1, wherein the processor is further programmed to generate the instruction to release the diagonal strut securing the first satellite stack to include an instruction to move the diagonal strut from a locked to an unlocked position.

14. The controller of claim 1, wherein the controller is integrated into a communication station remote from the rocket.

15. The controller of claim 14, wherein the communication station is located on Earth or another planetary body.

16. The controller of claim 14, wherein the communication station is located on a Track and Data Relay Satellite (TDRS).

17. A method of dispensing satellites from a rocket, comprising:
    determining a first time to release a first satellite stack of multiple satellite stacks secured to the rocket by a diagonal strut;
    generating an instruction to release the diagonal strut securing the first satellite stack to the rocket at the first time;
    generating an instruction to release a securing element securing a second satellite stack of the multiple satellite stacks to the rocket;
    generating satellite dispensing data that includes the instruction to release the diagonal strut securing the first satellite stack at the first time and the instruction to release the securing element securing the second satellite stack; and
    transmitting the satellite dispensing data to a communication module on the rocket.

18. The method of claim 17, further comprising determining a full stack release time to release a full stack diagonal strut that extends from a top of the first satellite stack to a bottom of the second satellite stack, wherein the first time to release the diagonal strut that secures the first satellite stack is based on the full stack release time to release the full stack diagonal strut.

19. The method of claim 17, wherein the determining the first time to release the first satellite stack is based on a time when the rocket reaches a desired trajectory and location in space.

20. The method of claim 17, wherein the satellite dispensing data is transmitted from a communication station located on Earth, another planetary body, or a Track and Data Relay Satellite (TDRS).

* * * * *